US012354237B2

(12) United States Patent
Zhou et al.

(10) Patent No.: US 12,354,237 B2
(45) Date of Patent: Jul. 8, 2025

(54) FEATURE-FREE PHOTOGRAMMETRIC 3D IMAGING WITH CAMERAS UNDER UNCONSTRAINED MOTION

(71) Applicants: DUKE UNIVERSITY, Durham, NC (US); RAMONA OPTICS INC., Durham, NC (US)

(72) Inventors: Kevin Zhou, Durham, NC (US); Colin Cooke, Durham, NC (US); Jaehee Park, Durham, NC (US); Ruobing Qian, Durham, NC (US); Roarke Horstmeyer, Durham, NC (US); Joseph Izatt, Durham, NC (US); Sina Farsiu, Durham, NC (US)

(73) Assignees: DUKE UNIVERSITY, Durham, NC (US); RAMONA OPTICS INC., Durham, NC (US)

( * ) Notice: Subject to any disclaimer, the term of this patent is extended or adjusted under 35 U.S.C. 154(b) by 703 days.

(21) Appl. No.: 17/547,731

(22) Filed: Dec. 10, 2021

(65) Prior Publication Data

US 2022/0188996 A1 Jun. 16, 2022

Related U.S. Application Data

(60) Provisional application No. 63/123,698, filed on Dec. 10, 2020.

(51) Int. Cl.
*G06T 5/50* (2006.01)
*G06T 5/70* (2024.01)
*G06T 5/80* (2024.01)

(52) U.S. Cl.
CPC ............. *G06T 5/50* (2013.01); *G06T 5/70* (2024.01); *G06T 5/80* (2024.01); *G06T 2207/20084* (2013.01); *G06T 2207/20221* (2013.01)

(58) Field of Classification Search
CPC .... G06T 5/50; G06T 5/80; G06T 5/70; G06T 2207/20084; G06T 2207/20221
(Continued)

(56) References Cited

U.S. PATENT DOCUMENTS

| 2002/0057279 A1* | 5/2002 | Jouppi | H04N 7/142 348/E7.079 |
| 2018/0139378 A1* | 5/2018 | Moriuchi | H04N 23/959 |

(Continued)

OTHER PUBLICATIONS

Zuurmond ("Accurate Camera Position Determination by Means of Moiré Pattern Analysis", Stellenbosch University 2015) (Year: 2015).*

(Continued)

*Primary Examiner* — Mark Roz
(74) *Attorney, Agent, or Firm* — Talem IP Law, LLP

(57) ABSTRACT

A method of mesoscopic photogrammetry can be carried out using a set of images captured from a camera on a mobile computing device. Upon receiving the set of images, the method generates a composite image, which can include applying homographic rectification to warp all images of the set of images onto a common plane; applying a rectification model to undo perspective distortion in each image of the set of images; and applying an undistortion model for adjusting for camera imperfections of a camera that captured each image of the set of images. A height map is generated co-registered with the composite image, for example, by using an untrained CNN whose weights/parameters are optimized in order to optimize the height map. The height map and the composite image can be output for display.

18 Claims, 12 Drawing Sheets

(58) Field of Classification Search
USPC .......................................................... 382/106
See application file for complete search history.

(56) References Cited

U.S. PATENT DOCUMENTS

2019/0026400 A1* 1/2019 Fuscoe ..................... G06F 30/13
2021/0004933 A1* 1/2021 Wong ...................... G06T 7/174

OTHER PUBLICATIONS

MVDepthNet: Real-time Multiview Depth Estimation Neural Network, 3D Vision, 2018 (Year: 2018).*

Zhou, Kevin C. et al., "Mesoscopic Photogrammetry With an Unstabilized Phone Camera," Proceedings of the IEEE/CVF Conference on Computer Vision and Pattern Recognition (CVPR), Jun. 2021, pp. 7535-7545.

Abadi, Martin et al., "TensorFlow: A System for Large-Scale Machine Learning," 12th USENIX Symposium on Operating Systems Design and Implementation (OSDI 16), Nov. 2016, pp. 265-283, USENIX Association, Savannah, GA.

Aguerrebere, Cecilia et al., "A Practical Guide to Multi-Image Alignment," 2018 IEEE International Conference on Acoustics, Speech and Signal Processing (ICASSP), Apr. 2018 (accessible Feb. 9, 2018), pp. 1927-1931, IEEE, Calgary, AB.

Alismail, Hatem et al., "Photometric Bundle Adjustment for Vision-Based SLAM," Computer Vision—ACCV 2016, Mar. 12, 2017 (accessible Aug. 5, 2016), pp. 324-341, vol. 10114, , Springer International Publishing, Cham.

Goodfellow, Ian et al., "Deep learning, vol. 1", Oct. 3, 2015, 706 pages, MIT press Cambridge.

Bianco, Simone et al., "Evaluating the Performance of Structure from Motion Pipelines," Journal of Imaging, Aug. 1, 2018, p. 98, vol. 4, issue 8.

Brown, Duane C. "Decentering Distortion of Lenses," PE, 1966, pp. 444-462, vol. 32, issue 3.

Camposeco, Federico et al., "Non-parametric structure-based calibration of radially symmetric cameras," Proceedings of the IEEE International Conference on Computer Vision, Dec. 2015, pp. 2192-2200.

Chen, Tianqi et al., "Training Deep Nets with Sublinear Memory Cost", Apr. 22, 2016, arXiv, pp. 1-12.

Delaunoy, Amael et al., "Photometric Bundle Adjustment for Dense Multi-View 3D Modeling," Proceedings of the IEEE Conference on Computer Vision and Pattern Recognition (CVPR), Jun. 2014, 8 pages.

Engel, Jakob et al., "Direct Sparse Odometry," IEEE Transactions on Pattern Analysis and Machine Intelligence, Mar. 1, 2018, pp. 611-625, vol. 40, issue 3.

Engel, Jakob et al., "LSD-SLAM: Large-Scale Direct Monocular SLAM," Computer Vision—ECCV 2014, Sep. 2014, pp. 834-849, vol. 8690, Springer International Publishing, Cham.

Fitzgibbon, A. W. "Simultaneous linear estimation of multiple view geometry and lens distortion," Proceedings of the 2001 IEEE Computer Society Conference on Computer Vision and Pattern Recognition. CVPR 2001, Dec. 2001, 8 pages, vol. 1, IEEE Comput. Soc, Kauai, Hi, USA.

Fuentes-Pacheco, Jorge et al., "Visual simultaneous localization and mapping: a survey," Artificial Intelligence Review, Nov. 2015 (accessible Nov. 13, 2012), pp. 55-81, vol. 43, issue 1.

Fuhrmann, Simon et al., "MVE—A Multi—View Reconstruction Environment," Eurographics Workshop on Graphics and Cultural Heritage, Oct. 2014, 8 pages, The Eurographics Association.

Furukawa, Yasutaka et al., "Multi-View Stereo: A Tutorial," Foundations and Trends® in Computer Graphics and Vision, Jun. 23, 2015, pp. 1-148, vol. 9, issue 1-2.

Ghosh, Pallabi et al., "Deep depth prior for multi-view stereo," ArXiv Preprint ArXiv:2001.07791, 2020 (accessible Dec. 1, 2020), 12 pages, vol. 2.

Godard, Clement et al., "Digging Into Self-Supervised Monocular Depth Estimation," Proceedings of the IEEE/CVF International Conference on Computer Vision (ICCV), Oct. 2019, pp. 3828-3838.

Gordon, Ariel et al., "Depth From Videos in the Wild: Unsupervised Monocular Depth Learning From Unknown Cameras," Proceedings of the IEEE/CVF International Conference on Computer Vision (ICCV), Oct. 2019, pp. 8977-8986.

Griewank, Andreas et al., "Algorithm 799: revolve: an implementation of checkpointing for the reverse or adjoint mode of computational differentiation," ACM Transactions on Mathematical Software, Mar. 2000, pp. 19-45, vol. 26, issue 1.

Hanna, K. J. "Direct multi-resolution estimation of ego-motion and structure from motion," Proceedings of the IEEE Workshop on Visual Motion, 1991, pp. 156-162, IEEE Comput. Soc. Press, Princeton, NJ, USA.

Hartley, R. et al. "Parameter-Free Radial Distortion Correction with Center of Distortion Estimation," IEEE Transactions on Pattern Analysis and Machine Intelligence, Aug. 2007 (accessible Jan. 18, 2007), pp. 1309-1321, vol. 29, issue 8.

Heckel, Reinhard et al. "Deep Decoder: Concise Image Representations from Untrained Non-convolutional Networks", Mar. 12, 2019 (accessible Oct. 2, 2018), arXiv, 17 pages.

Heel, Joachim "Direct estimation of structure and motion from multiple frames", Mar. 1, 1990, Massachusetts Inst of Tech Cambridge Artificial Intelligence Lab, 70 pages.

Horn, Berthold K. P. et al. "Direct methods for recovering motion," International Journal of Computer Vision, Jun. 1988, pp. 51-76, vol. 2, issue 1.

Hou, Yuxin et al., "Multi-View Stereo by Temporal Nonparametric Fusion," Proceedings of the IEEE/CVF International Conference on Computer Vision (ICCV), Oct. 2019, pp. 2651-2660.

Huang, Po-Han et al., "DeepMVS: Learning Multi-View Stereopsis," Proceedings of the IEEE Conference on Computer Vision and Pattern Recognition (CVPR), Jun. 2018, pp. 2821-2830.

Im, Sunghoon et al., "DPSNet: End-to-end Deep Plane Sweep Stereo", May 2, 2019, arXiv, 12 pages.

Kingma, Diederik P. et al. "Adam: A Method for Stochastic Optimization", Dec. 22, 2014, arXiv, 15 pages.

Kumar, R., et al. "Direct recovery of shape from multiple views: a parallax based approach," Proceedings of 12th International Conference on Pattern Recognition, Oct. 1994, pp. 685-688, vol. 1, , IEEE Comput. Soc. Press, Jerusalem, Israel.

Le, Tung D. et al., "TFLMS: Large Model Support in TensorFlow by Graph Rewriting", Jul. 5, 2018, arXiv, 10 pages.

Li, Ruihao et al., "UnDeepVO: Monocular Visual Odometry Through Unsupervised Deep Learning," 2018 IEEE International Conference on Robotics and Automation (ICRA), May 2018, pp. 7286-7291, IEEE, Brisbane, QLD.

Lowe, David G. "Distinctive Image Features from Scale-Invariant Keypoints," International Journal of Computer Vision, Nov. 2004, pp. 91-110, vol. 60, issue 2.

Luhmann, Thomas "Close range photogrammetry for industrial applications," ISPRS Journal of Photogrammetry and Remote Sensing, Nov. 2010 (accessible Jul. 15, 2010), pp. 558-569, vol. 65, issue 6.

Mahjourian, Reza et al., "Unsupervised Learning of Depth and Ego-Motion From Monocular Video Using 3D Geometric Constraints," Proceedings of the IEEE Conference on Computer Vision and Pattern Recognition (CVPR), Jun. 2018, pp. 5667-5675.

Matthies, Larry et al., "Kalman filter-based algorithms for estimating depth from image sequences," International Journal of Computer Vision, Sep. 1989, pp. 209-238, vol. 3, issue 3.

Matthies, Larry H. et al., "Incremental estimation of dense depth maps from image sequences.," CVPR, Jun. 1988, pp. 366-374.

Moulon, Pierre et al., "OpenMVG: Open Multiple View Geometry," Reproducible Research in Pattern Recognition. RRPR 2016, Cacun, Mexico, Dec. 4, 2016, pp. 60-74, vol. 10214, Springer International Publishing, Cham.

Murez, Zak et al., "Atlas: End-to-End 3D Scene Reconstruction from Posed Images," Computer Vision—ECCV 2020, Aug. 2020, pp. 414-431, vol. 12352, Springer International Publishing, Cham.

(56) References Cited

OTHER PUBLICATIONS

Newcombe, Richard A. et al., "DTAM: Dense tracking and mapping in real-time," 2011 International Conference on Computer Vision, Nov. 2011, pp. 2320-2327, IEEE, Barcelona, Spain.

Oliensis, J. "Direct multi-frame structure from motion for hand-held cameras," Proceedings 15th International Conference on Pattern Recognition. ICPR-2000, Sep. 2000, pp. 889-895, vol. 1, IEEE Comput. Soc, Barcelona, Spain.

Peggs, G. N. et al., "Recent developments in large-scale dimensional metrology," Proceedings of the Institution of Mechanical Engineers, Part B: Journal of Engineering Manufacture, Jun. 1, 2009, pp. 571-595, vol. 223, issue 6.

Ranjan, Anurag et al., "Competitive Collaboration: Joint Unsupervised Learning of Depth, Camera Motion, Optical Flow and Motion Segmentation," Proceedings of the IEEE/CVF Conference on Computer Vision and Pattern Recognition (CVPR), Jun. 2019, pp. 12240-12249.

Robinson, D. et al., "Optimal Registration Of Aliased Images Using Variable Projection With Applications To Super-Resolution," The Computer Journal, Feb. 19, 2008 (accessible Apr. 12, 2007), pp. 31-42, vol. 52, issue 1.

Rupnik, Ewelina et al., "MicMac—a free, open-source solution for photogrammetry," Open Geospatial Data, Software and Standards, Dec. 2017, 9 pages, vol. 2, issue 1, article 14.

Sawhney, "3D geometry from planar parallax," Proceedings of IEEE Conference on Computer Vision and Pattern Recognition CVPR-94, Jun. 21, 1994, pp. 929-934, IEEE Comput. Soc. Press, Seattle, WA, USA.

Schonberger, Johannes L. et al., "Structure-From-Motion Revisited," Proceedings of the IEEE Conference on Computer Vision and Pattern Recognition (CVPR), Jun. 2016, pp. 4104-4113.

Schops, Thomas et al., "Why Having 10,000 Parameters in Your Camera Model Is Better Than Twelve," Proceedings of the IEEE/CVF Conference on Computer Vision and Pattern Recognition (CVPR), Jun. 2020, pp. 2535-2544.

Stein, G. P. et al., "Model-based brightness constraints: on direct estimation of structure and motion," IEEE Transactions on Pattern Analysis and Machine Intelligence, Sep. 2000, pp. 992-1015, vol. 22, issue 9.

Tang, Chengzhou et al., "BA-Net: Dense Bundle Adjustment Network", Jun. 13, 2018, arXiv, 18 pages.

Teed, Zachary et al., "DeepV2D: Video to Depth with Differentiable Structure from Motion", Dec. 11, 2018, arXiv, 20 pages.

Ullman, S. "The interpretation of structure from motion," Proceedings of the Royal Society of London. Series B. Biological Sciences, Jan. 15, 1979, pp. 405-426, vol. 203, issue 1153.

Ulyanov, Dmitry et al., "Deep Image Prior," Proceedings of the IEEE Conference on Computer Vision and Pattern Recognition (CVPR), Jun. 2018, pp. 9446-9454.

Vijayanarasimhan, Sudheendra et al., "SfM-Net: Learning of Structure and Motion from Video", Apr. 25, 2017, arXiv, 9 pages.

Wang, Chaoyang et al., "Learning Depth From Monocular Videos Using Direct Methods," Proceedings of the IEEE Conference on Computer Vision and Pattern Recognition (CVPR), Jun. 2018, pp. 2022-2030.

Wang, Kaixuan et al., "MVDepthNet: Real-Time Multiview Depth Estimation Neural Network," 2018 International Conference on 3D Vision (3DV), Sep. 2018 (accessible Jul. 23, 2018), pp. 248-257, IEEE, Verona.

Wei, Xingkui et al., "DeepSFM: Structure from Motion via Deep Bundle Adjustment," Computer Vision—ECCV 2020, Aug. 2020 (accessible Dec. 20, 2019), pp. 230-247, vol. 12346, Springer International Publishing, Cham.

Wu, Changchang, "Towards Linear-Time Incremental Structure from Motion," 2013 International Conference on 3D Vision, Jun. 2013, pp. 127-134, IEEE, Seattle, WA, USA.

Wu, Changchang, "Critical Configurations For Radial Distortion Self-Calibration," Proceedings of the IEEE Conference on Computer Vision and Pattern Recognition (CVPR), Jun. 2014, pp. 25-32.

Yao, Yao et al., "MVSNet: Depth Inference for Unstructured Multi-view Stereo," Proceedings of the European Conference on Computer Vision (ECCV), Sep. 2018 (accessible Apr. 7, 2018), pp. 767-783.

Yin, Zhichao et al., "GeoNet: Unsupervised Learning of Dense Depth, Optical Flow and Camera Pose," Proceedings of the IEEE Conference on Computer Vision and Pattern Recognition (CVPR), Jun. 2018 (accessible Mar. 6, 2018), pp. 1983-1992.

Zhan, Huangying et al., "Unsupervised Learning of Monocular Depth Estimation and Visual Odometry With Deep Feature Reconstruction," Proceedings of the IEEE Conference on Computer Vision and Pattern Recognition (CVPR), Jun. 2018 (accessible Mar. 11, 2018), pp. 340-349.

Zhou, Huizhong et al., "DeepTAM: Deep Tracking and Mapping," Proceedings of the European Conference on Computer Vision (ECCV), Sep. 2018 (accessible Aug. 6, 2018), pp. 822-838.

Zhou, Kevin C. et al., "Diffraction tomography with a deep image prior," Optics Express, Apr. 27, 2020 (accessible Dec. 10, 2019), pp. 12872-12896, vol. 28, issue 9.

Zhou, Kevin C. et al., "Optical coherence refraction tomography," Nature Photonics, Nov. 2019 (accessible Aug. 19, 2019), pp. 794-802, vol. 13, issue 11.

Zhou, Tinghui et al., "Unsupervised Learning of Depth and Ego-Motion From Video," Proceedings of the IEEE Conference on Computer Vision and Pattern Recognition (CVPR), Jul. 2017, pp. 1851-1858.

\* cited by examiner

FEATURE-FREE PHOTOGRAMMETRIC 3D IMAGING WITH CAMERAS UNDER UNCONSTRAINED MOTION

STATEMENT REGARDING FEDERALLY SPONSORED RESEARCH

This invention was made with Government support under Federal Grant no. CBET-1902904 awarded by the National Science Foundation. The Federal Government has certain rights to this invention.

BACKGROUND

Photogrammetry involves making measurements from photographs, where photographs are used to generate a map, drawing, measurement, or 3D model of an object or scene. Photogrammetric 3D imaging allows for reconstruction of 3D representations of an object or scene from 2D images taken from multiple viewpoints.

Photogrammetry tools have been developed and applied to both long-range, macro-scale applications, such as building-scale reconstructions or aerial topographical mapping, and close-range, meter-scale applications, such as industrial metrology. However, comparatively less work has been done to enable photogrammetry at mesoscopic (mm variation) and microscopic scales, where additional issues arise, such as more limited depths of field and increased impact of camera distortion. Existing approaches at smaller scales typically require very careful camera distortion pre-calibration, expensive cameras, dedicated setups that allow well-controlled camera or sample motion (e.g., with a dedicated rig), or attachment of control points to the object.

Thus, there is a need for effective mesoscopic photogrammetry that can be performed even using a camera on a device as ubiquitous as a smart phone to take pictures without a dedicated setup.

BRIEF SUMMARY

Feature-free photogrammetric 3D imaging with cameras under unconstrained motion is possible through a method of mesoscopic photogrammetry involving adjusting for the camera imperfections using an undistortion model. Optimization of the reconstructed height map can be accomplished using an untrained CNN that receives raw images as input to output a height map and optimizing the weights/parameters of the CNN instead of directly optimizing the height map.

A method of mesoscopic photogrammetry can be carried out using a set of images captured from a camera on a mobile computing device. Upon receiving the set of images, the method generates a composite image, which can include applying homographic rectification to warp all images of the set of images on a same plane; applying a perspective distortion rectification model to undo perspective distortion in each image of the set of images; and applying an undistortion model for adjusting for camera imperfections of a camera that captured each image of the set of images. A height map is generated co-registered with the composite image. The height map and the composite image can be output for display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Feature-free photogrammetric 3D imaging with cameras under unconstrained motion is possible through a method of mesoscopic photogrammetry involving adjusting for the camera imperfections using an undistortion model. Optimization of the reconstructed height map can be accomplished using an untrained CNN that receives raw images as input to output a height map and optimizing the weights/parameters of the CNN instead of directly optimizing the height map.

Figure 1A:
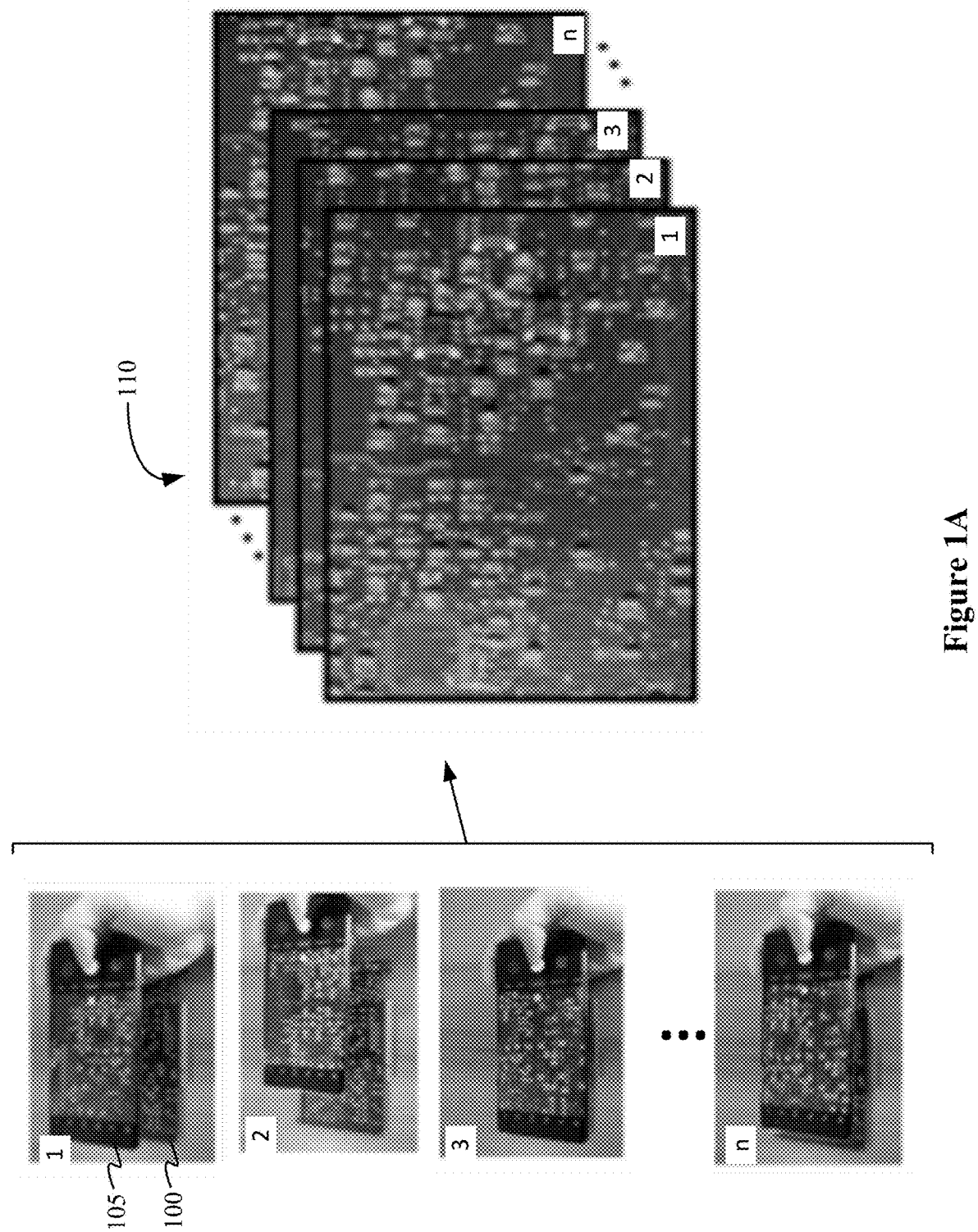
FIGS. 1A-IC illustrate inputs and outputs of feature-free photogrammetric 3D imaging using a camera of a mobile device.
Figure 1B:
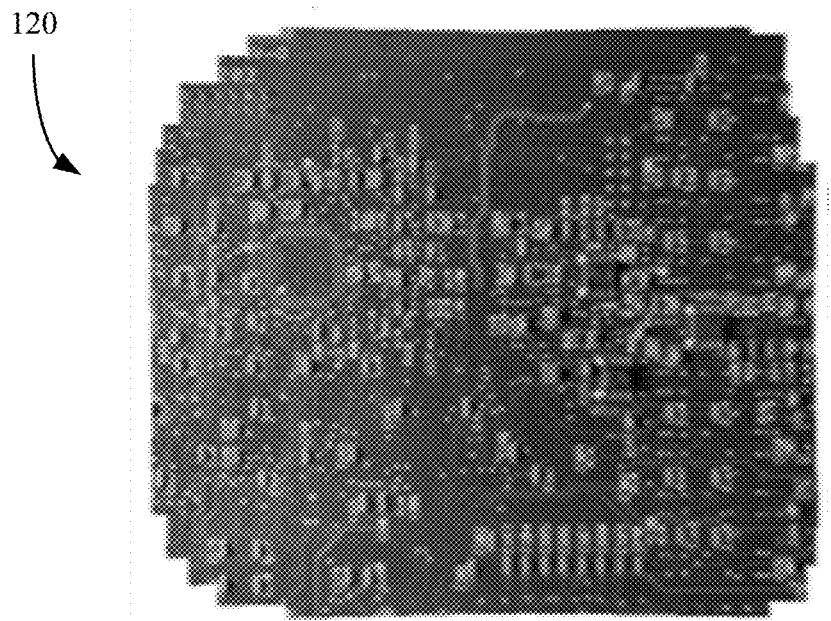
Figure 1C:
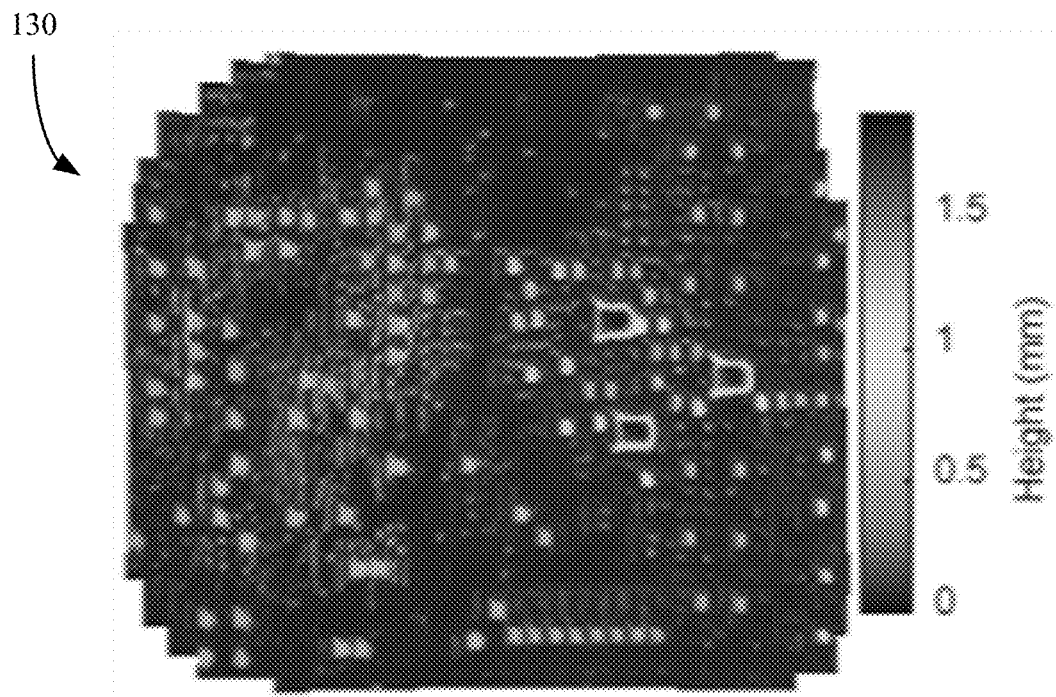
Figure 2:
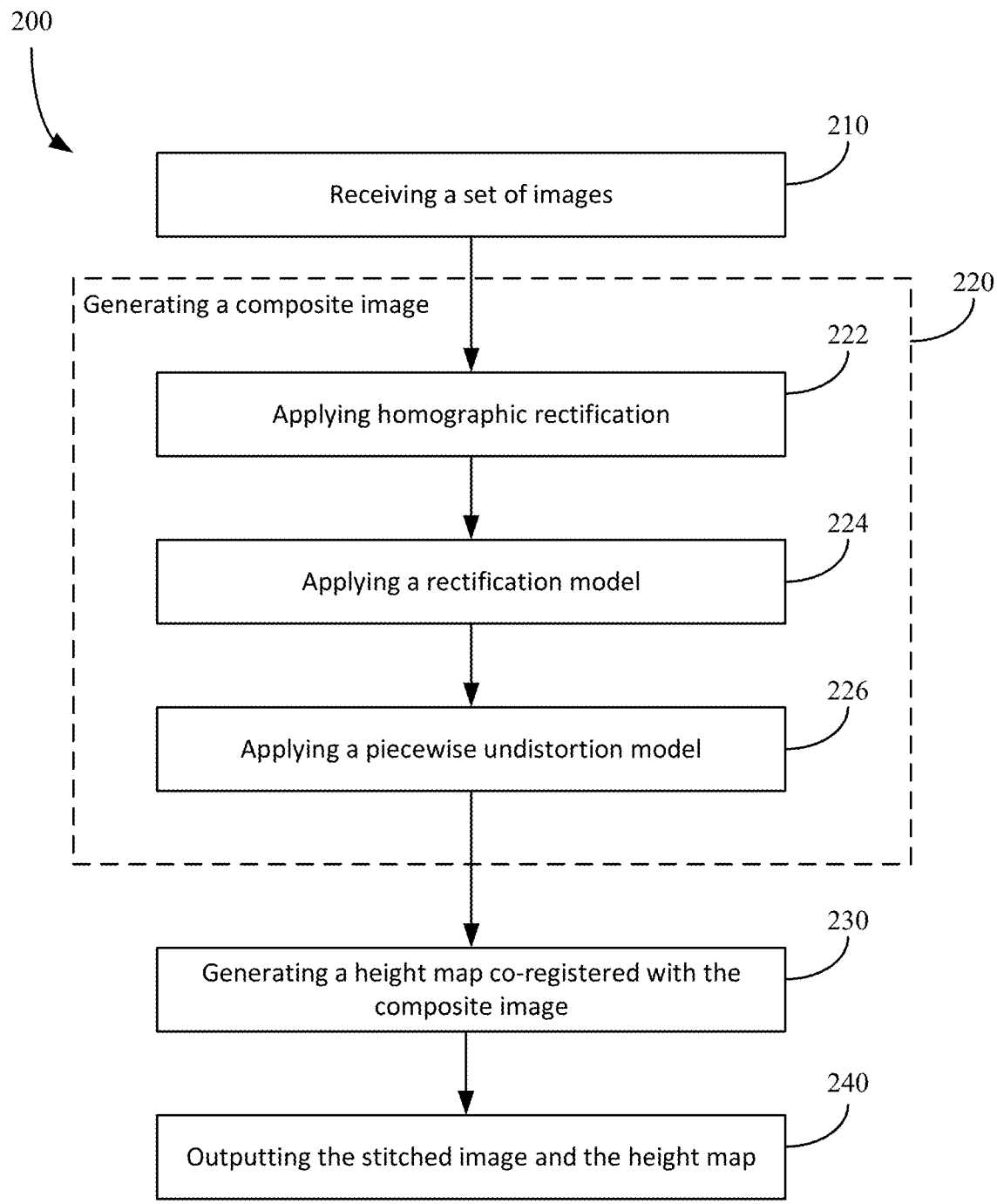
FIG. 2 illustrates a method of mesoscopic photogrammetry that can be carried out using a set of images captured from a camera on a mobile computing device.

FIGS. 1A-1C illustrate inputs and outputs of feature-free photogrammetric 3D imaging using a camera of a mobile device; and FIG. 2 illustrates a method of mesoscopic photogrammetry that can be carried out using a set of images captured from a camera on a mobile computing device.

Referring to FIG. 1A, image acquisition can be carried out with a handheld device at multiple positions. In the illustrated example, images of a printed circuit board 100 are being captured using a smartphone 105 in order to obtain quantitative 3D mesoscopic images of the object with 100 μm to mm scale height variations at tens of micron accuracies with unstabilized, freehand motion and without precalibration of camera distortion. Here a plurality of images 110 (1, 2, 3, . . . n) are captured and used for photogrammetric reconstruction. The described method of mesoscopic photogrammetry providing the photogrammetric reconstruction may be executed on the smartphone 105 (or other computing device used to capture the images) or may be executed by a separate computing device, described in more detail with respect to FIG. 6.

Referring to FIG. 2, a method 200 of mesoscopic photogrammetry includes receiving (210) a set of images. For example, a device executing method 200 (e.g., smartphone 105) can receive the set of images 110. The method 200 includes generating (220) a composite image. The process to generate a composite image can include applying homographic rectification (222), applying a rectification model (224), and applying an undistortion model (226). In some cases, the process to generate a composite image may omit the application of the undistortion model, for example, when a camera capturing the images do not cause distortion.

The homographic rectification (222) is applied to warp all images of the set of images onto a common plane. The perspective distortion rectification model (224) is applied to undo perspective distortion in each image of the set of images. Example perspective distortion rectification models include an orthorectification model and an arbitrary reference rectification model. An undistortion model (226) is applied to adjust for camera imperfections (e.g., distortion, aberration, misalignment) of a camera that captured each image of the set of images. The undistortion model can be a piecewise linear or other nonparametric model. Although operations 222, 224, and 226 are shown in a particular order, these processes can be performed simultaneously or in any order. In addition, these processes can be implemented as part of a backprojection procedure for performing the registration process to generate the composite image, as described in detail with respect to FIG. 3. The described process allows for joint estimation of the composite image (e.g., RGB image) and coaligned height map.

The resulting composite image is bigger than the field of view of the camera, for example, as seen by the composite image 120 of FIG. 1B.

Method 200 further includes generating (230) a height map co-registered with the composite image. Generating (230) the height map can include applying a raw image form of each image of the set of images as input to a neural network, for example, an untrained convolutional neural network (CNN), and optimizing parameters of the CNN to optimize the height map, described in more detail with respect to FIG. 5.

The resulting height map is able to differentiate mesoscopic differences. For example, referring to FIG. 1C, a height map 130 shows heights of objects that are smaller than 2 mm.

Method 200 further includes outputting (240he height map and the composite image for display.

Accordingly, in some cases, a method of mesoscopic photogrammetry includes receiving a set of images; applying homographic rectification to warp all images of the set of images onto a common plane; applying a perspective distortion rectification model to undo perspective distortion in each image of the set of images; applying an undistortion model for adjusting for camera imperfections of a camera that captured each image of the set of images; generating a height map; and outputting the height map and a composite image for display.

In addition, in some cases, a method of mesoscopic photogrammetry includes receiving a set of images; applying homographic rectification to warp all images of the set of images onto a common plane; applying a perspective distortion rectification model to undo perspective distortion in each image of the set of images; applying a raw image form of each image of the set of images as input to a neural network that outputs an intermediary height map; optimizing parameters of the neural network to optimize the intermediary height map to generate a height map co-registered with a composite image of the set of images; and outputting the height map and a composite image for display.

Figure 3:
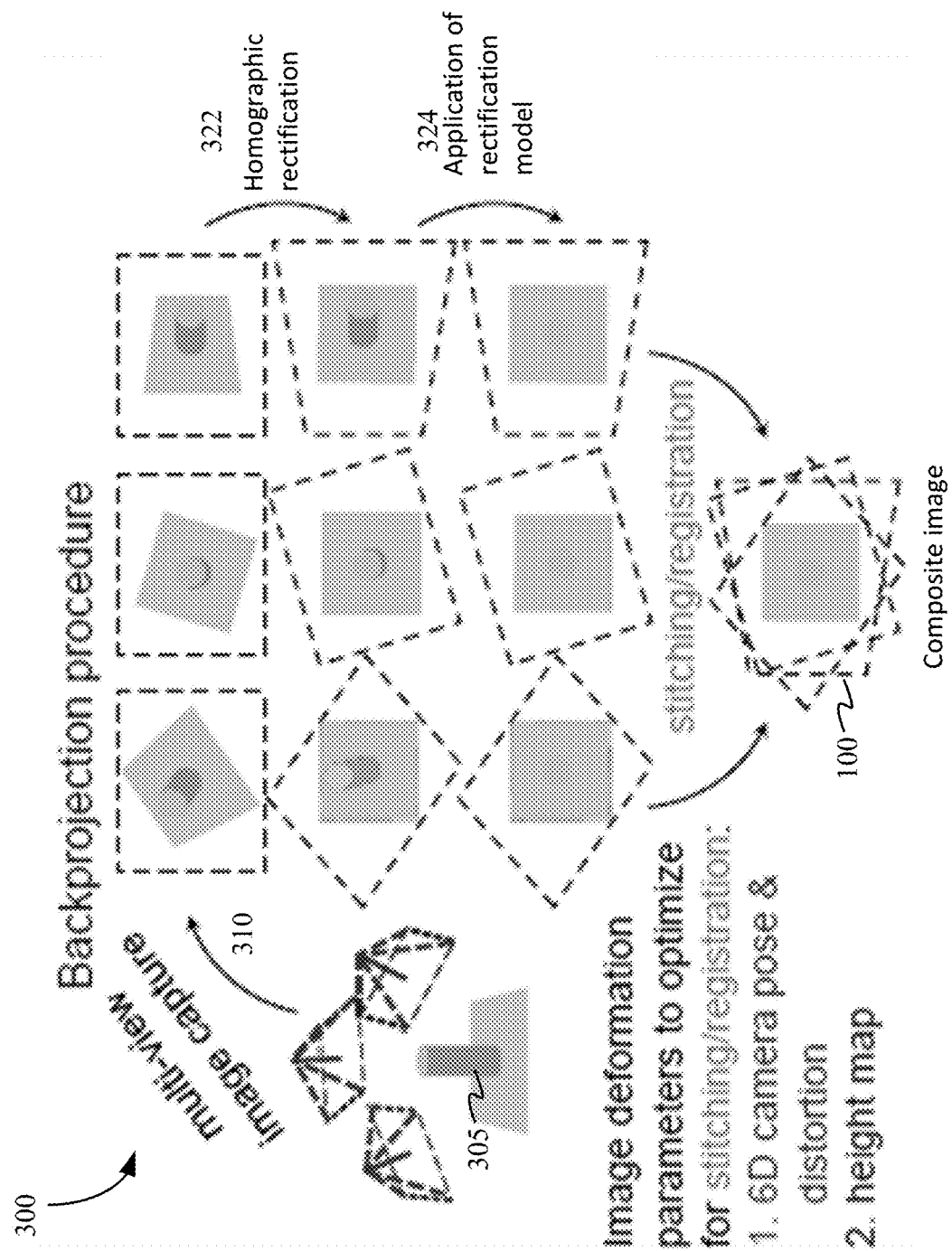
FIG. 3 illustrates a backprojection procedure for performing a registration process of a method of mesoscopic photogrammetry.

FIG. 3 illustrates a backprojection procedure for performing a registration process of a method of mesoscopic photogrammetry. Referring to FIG. 3, a backprojection procedure 300 can be applied to a set of images captured of an object 305 that are received (310) by the device executing the backprojection procedure for performing the registration process of the method of mesoscopic photogrammetry. The set of images provide multiple views of the object 305. The backprojection procedure involves homographic rectification (322), application of a perspective distortion rectification model (324), and application of an undistortion model (not shown). Optimization is carried out on a 6D camera pose and distortion and on a height map.

The homographic rectification (322) can be performed as part of a 2D backprojection process as follows.

The procedure for a 2D backprojection of a point in the camera image plane in the camera's intrinsic coordinate system relative to the projection center, $r_{im}^{cam}=(x_{im}^{cam}, y_{im}^{cam}, f_{ph})$, onto the object plane in the world reference frame includes the following four operations. This procedure ignores 3D height variation. For clarity, cam superscripts indicates that the variables are defined in the camera's reference frame, and obj and im subscripts reference the object and image planes, respectively.

1. Rotation in the image plane by $\theta$:
$(x_{im}^{cam}, y_{im}^{cam}) \leftarrow (x_{im}^{cam}, y_{im}^{cam})R(\theta)$, where $R(\theta)$ is a 2D rotation matrix. Let $r_{im}^{cam}$ be accordingly updated.

2. Backprojection to the object plane:

$$r_{obj}^{cam} = \frac{Z}{\hat{n}_{obj}^{cam} \cdot r_{im}^{cam}} r_{im}^{cam},$$

where • denotes a dot product and $\hat{n}_{obj}^{cam}=(n_x, n_y, n_z)$ is the unit normal vector of the object plane defined in the camera's reference frame. For example, $\hat{n}_{obj}^{cam}=(0,0,-1)$ when the image and object planes are parallel.

3. coordinate change via 3D rotation from camera coordinates, $r_{obj}^{cam}$, to world coordinates, $r_{obj}=(x_{obj},y_{obj})$ (i.e., by angle, $\cos^{-1}(-n_z)$, about axis, $(-n_y, n_x, 0)$):

$$x_{obj} = \frac{Z(1+n_z)((n_y^2+n_z-1)x_{im}-n_xn_yy_{im})}{n_z(n_x^2+n_y^2)\hat{n}_{obj}^{cam} \cdot r_{im}^{cam}}.$$

$$y_{obj} = \frac{Z(1+n_z)((n_x^2+n_z-1)y_{im}-n_xn_yx_{im})}{n_z(n_x^2+n_y^2)\hat{n}_{obj}^{cam} \cdot r_{im}^{cam}}.$$

In practice, this equation is numerically unstable, as it involves dividing $1+n_z$ by $n_x^2+n_y^2$, which are both 0 when the image and the object planes are parallel. Accordingly, certain embodiments use its second-order Taylor expansion at $n_x=0$, $n_y=0$, which is valid by the lateral-translation-dominant assumption ($|n_x|, |n_y| \ll |n_z| \approx 1$).

$$x_{obj} \approx \frac{Z}{f_{ph}n_z}\left(x_{im} + \frac{x_{im}(n_xx_{im}+n_yy_{im})}{f_{ph}} + \right.$$

-continued $$y_{obj} \approx \frac{Z}{f_{ph}n_z}\left(y_{im} + \frac{y_{im}(n_x x_{im} + n_y y_{im})}{f_{ph}} + \frac{f_{ph}^2 n_x(n_x x_{im} + n_y y_{im}) + 2y_{im}(n_x x_{im} + n_y y_{im})^2}{2f_{ph}^2}\right).$$

Note that the zero-order terms correspond to the usual camera-centric perspective projection expressions.

4. Addition of camera lateral position, R=(X,Y):

$$x_{obj} \leftarrow x_{obj} + X, \ y_{obj} \leftarrow y_{obj} + Y.$$

This backprojection procedure onto a common object plane is performed for each image.

As previously mentioned with respect to operation 224 of FIG. 2, application of a rectification model (324) can include applying an orthorectification model or an arbitrary reference rectification model as the image deformation model.

FIGS. 4A-4D illustrate example perspective distortion rectification model components of an image deformation model.

Image registration of the 2D images is often centered around feature points and the stitching of registered images into a composite image often involves 3D point cloud estimation of the object and camera positions and poses. However, instead of incorporating 3D point cloud estimation, pixel-wise image registration is performed without requiring inference of point correspondences and that operates on rasterized 2D height rather than 3D point clouds, enabling the incorporation of neural networks, such as an untrained convolutional neural network, for assisting with height map reconstruction.

In particular, it is possible to register and stitch the 2D camera images from multiple views into a single consistent composite mosaic by using an image deformation model parameterized by the camera model parameters and a sample height map to warp and co-rectify the camera images so that the camera images appear to have been taken from a single common perspective, allowing joint estimation of the stitched RGB image and coaligned height map.

Figure 4A:
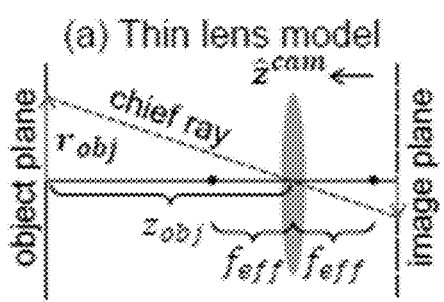
FIGS. 4A-4D illustrate example perspective distortion rectification model components of an image deformation model.
Figure 4B:
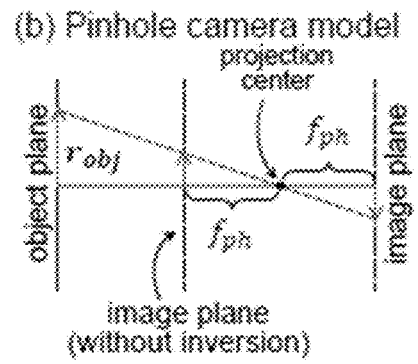

Referring to FIGS. 4A and 4B, which illustrate a thin lens model and pinhole camera, respectively, assuming an ideal camera, image formation can be described by a pinhole camera model, whereby a 3D scene is projected onto a 2D image plane along lines that converge at a point, the center of projection, with a pinhole camera focal length, $f_{ph}$. The camera itself, however, is governed by an effective focal length, $f_{eff}$, and is related to $f_{ph}$ by the thin lens equation, $$\frac{1}{z_{obj}} + \frac{1}{f_{ph}} = \frac{1}{f_{eff}},$$

where $z_{obj}$ is the distance of the object being imaged from the pinhole camera focus, which corresponds to the position of the thin lens. Thus, the projection lines of the pinhole camera model correspond to chief rays in the lens model. When imaging scenes at very far distances ($z_{obj} \gg f_{ph}$), $f_{ph} \approx f_{eff}$, a good assumption for long-range but less so for very close-range applications.

Accordingly, because a scene is not flat (height variation, h(x, y)) and the camera is tilted (orientation $\hat{n}_{im}$), the described techniques use a rectification model to undo perspective distortion. That is, to extend the image deformation model to allow registration of scenes with height variation, each backprojected image is warped to a common reference in a pixel-wise fashion.

Figure 4C:
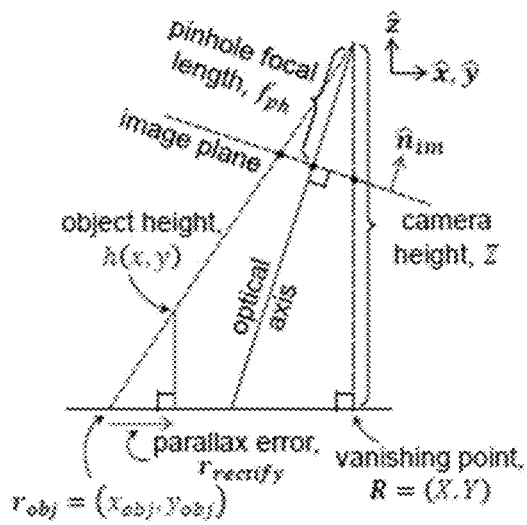

FIG. 4C illustrates an orthorectification model that may be used for the warping. Orthorectification can be interpreted as rectifying to a world reference. The orthorectification model assumes a reference frame whose projection center is at infinity, such that all projection lines are parallel to $\hat{z}$. Here, the orthorectification applied pixel-wise to each image (having RGB and H data) can be given as $h(r_{obj} + r_{rectify}) = -Z\Delta r|r_{obj} - R|^{-1}$, where for each camera image backprojection, the radial deformation field ($r_{rectify}$) is estimated as $$r_{rectify}(r_{obj}) = \Delta r(r_{obj} - R)|r_{obj} - R|^{-1},$$

which is a function of position in the object plane, $r_{obj} = (x_{obj}, y_{obj})$, and moves each pixel a signed distance of $\Delta r$ towards the vanishing point, R=(X, Y), the point to which all lines normal to the object plane appear to converge in the homographically rectified camera image. $\Delta r$ is directly proportional to the height at the new rectified location.

Figure 4D:
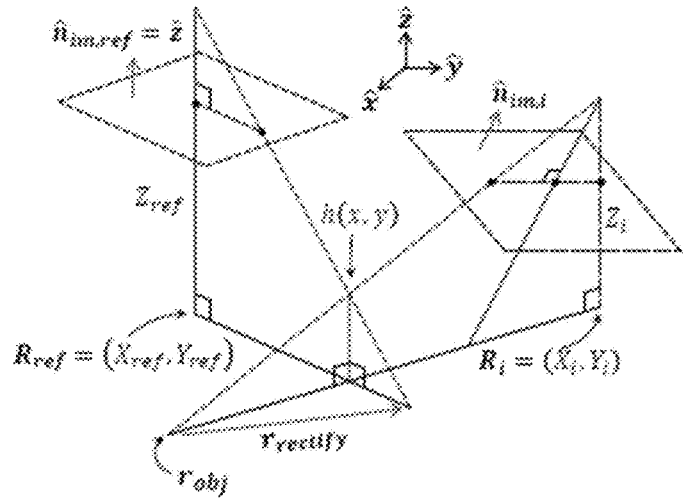

Orthorectification is a limiting case of the more general, arbitrary reference rectification, which is illustrated in FIG. 4D. Here, warping is made to an arbitrary camera-centric reference frame, specified by its vanishing point, $R_{ref}$, projection center height $Z_{ref}$ and an orientation such that the image and object planes are parallel.

Given the $i^{th}$ camera image, whose extrinsics are similarly specified by $R_i$, $Z_i$, and $\hat{n}_{im,i}$, the vector that warps a point, $r_{obj}$, to the reference frame is given by:

$$r_{rectify}(r_{obj}) = \frac{h}{Z_i}\frac{Z_i - Z_{ref}}{Z_{ref} - h}(r_{obj} - R_i) + \frac{h}{Z_{ref} - h}(R_i - R_{ref}).$$

As previously mentioned with respect to operation 226 of FIG. 2, the undistortion model can be a piecewise linear or other nonparametric model. The undistortion model can be performed as part of backprojection process 300 as illustrated in FIG. 3 simultaneously with or at any time before completion of the backprojection operations of homographic rectification 322 and application of the rectification model 324.

The undistortion model is included because camera lenses and sensor placement are not perfect, giving rise to image distortion. This can pose problems for close-range, mesoscale applications, as the 3D-information-encoding parallax shifts be-come more similar in magnitude to image deformation due to camera distortion. Instead of using polynomial models, more general nonparametric models may be used. In a specific embodiment, a piecewise linear, nonparametric model is used that includes a radially dependent relative magnification factor that is discretized into $n_r$ points, $\{\tilde{M}_t\}_{t=0}^{n_r-1}$, paced by $\delta_r$ with intermediate points linearly interpolated as:

$$\tilde{M}(r) = \left(1 + \left\lfloor\frac{r}{\delta_r}\right\rfloor - \frac{r}{\delta_r}\right)\tilde{M}_{\left\lfloor\frac{r}{\delta_r}\right\rfloor} + \left(\frac{r}{\delta_r} - \left\lfloor\frac{r}{\delta_r}\right\rfloor\right)\tilde{M}_{\left\lfloor\frac{r}{\delta_r}\right\rfloor+1},$$

where $\lfloor \cdot \rfloor$ is a flooring operation, $0 \leq r < (n_r-1)\delta_r$ is a radial distance from a distortion center. Here, for a given point in each image, $r_{im}$, the applying of the piecewise linear undistortion model is given by $r_{im} \leftarrow \tilde{M}(|r_{im}|)r_{im}$.

A piecewise linear model, unlike high-order polynomials, also has the advantage of being trivially analytically invertible, allowing easy computation of both image distortion and undistortion.

The collective image deformation parameters of the homographic rectification, camera undistortion, and rectification model can be denoted as w.

As mentioned with respect to FIG. 3, the image deformation parameters to optimize for stitching/registration include the 6D camera pose and distortion and the height map. The optimization of these parameters contributes to generating the height map co-registered with the composite image.

Figure 5:
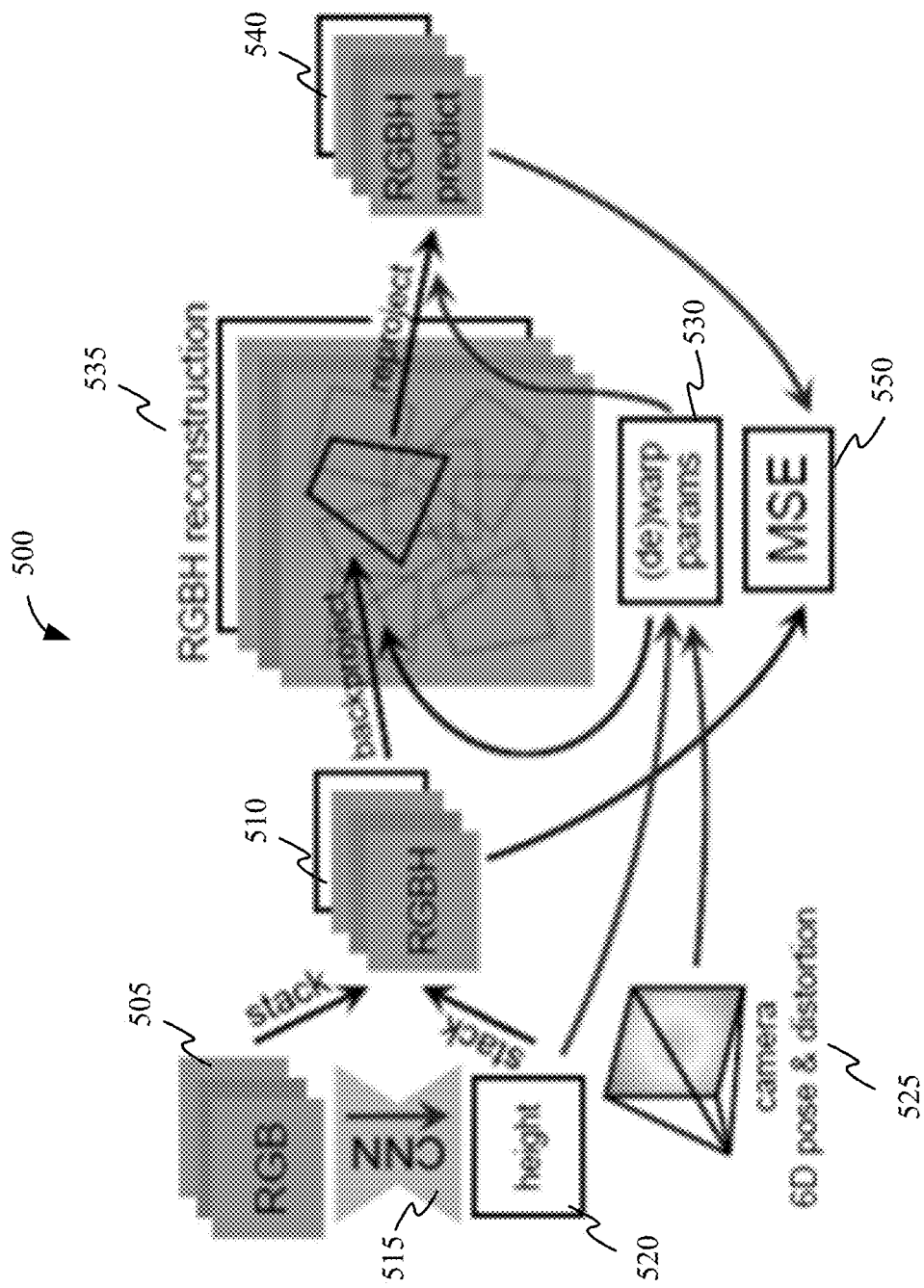
FIG. 5 illustrates a process of generating the height map co-registered with the composite image.

FIG. 5 illustrates a process of generating the height map co-registered with the composite image. Referring to FIG. 5, a reconstruction process 500 uses the estimate of image deformation parameters described above for backprojecting the received images. In process 500, a stack of RGB images 505 (only one shown for clarity) is augmented with their camera-centric height maps (RBGH) 510, which are reparameterized as outputs of an untrained CNN 515 that receives the raw RGB images 505 to output height map 520. In a specific implementation, the CNN 515 can be implemented with an encoder-decoder network architecture without skip connections. The camera-centric height maps and camera parameters 525 serve as the image deformation parameters 530, which rectify the RGBH images so that they can be registered and stitched together into a composite image (RGBH reconstruction 535). The same warping coordinates (parameters 530) are used to reproject the images to form a prediction (RGBH predict 540), whose mean square error (MSE) 550 with RGBH is minimized with respect to the CNN and camera parameters.

In detail, given the current estimate of the image deformation parameters, w, images may be simultaneously backprojected to form an estimate of the RGBH reconstruction, B, with the coaligned height map stacked as the fourth channel (H):

B←0, $B[X_w, Y_w] \leftarrow D_{RGBH}$, where $(x_w, y_w)$ are the flattened coordinates corresponding to the pixels of $D_{RGBH}$, which are the flattened RGB images augmented with the camera-centric height maps. If a pixel of B is visited multiple times, the values are averaged.

To guide the optimization, forward predictions are generated of the camera images, $\hat{D}_{RGBH}$ by using the exact same backprojection coordinates, $(x_w, y_w)$, to reproject back into the camera frames of reference and compute the mean square error (MSE) with the original camera images (as shown in FIG. 5). The idea is that if the backprojected images are consistent with each other at the pixels where they overlap, then the forward predictions will be more accurate. Gradient descent is then used to minimize the MSE with respect to the image deformation parameters, that is $$\min_{w} \|\hat{D}_{RGBH} - D_{RGBH}\|^2.$$

To avoid local minima, a multi-scale strategy can be adopted, whereby both $D_{RGBH}$ and B are subject to a down-sampling procedure that can be relaxed over time. Further, the height map may not be updated until the lowest downsampling factor is reached. If the scene consists of non-repetitive structures and the camera images exhibit a lot of overlap, initializing each image to the same position can be a good initial guess. However, if this fails, sequential cross-correlation-based estimates or similar strategies can be used for initialization.

As mentioned above, the camera-centric height maps can be reparameterized as the output of a CNN with the respective RGB images as the inputs. Instead of optimizing for the per-image height maps, the weights of a single untrained CNN can be optimized as a deep image prior (DIP), whose structure alone exhibits a bias towards "natural" images. By using an encoder-decoder network architecture without skip connections, the information flows through a bottleneck, which allows for the degree of compression in the CNN to be an interpretable regularization hyperparameter, where restricting information flow may force the network to discard artifacts.

The contribution of the height values to the MSE can be used to make the camera-centric height maps more consistent irrespective of the backprojection result. This can be useful, for example, when filling in height values at the vanishing points, which are blind spots, as $h \propto r_{rectify}(R)=0$. Since RGB values and height values are not directly comparable, a regularization hyperparameter can be used that scales their relative contributions.

To facilitate performing the described method on a GPU, gradient checkpointing, CPU memory swapping, blocking backpropagation through the reconstruction and batching with a running-average reconstruction can be performed.

For blocking backpropagation through the reconstruction, instead of computing the total gradient of the loss with respect to the image deformation parameters, which would require backpropagation across every path that leads to the deformation parameters, partial gradients can be computed using only the paths that lead to the deformation parameters without going through the reconstruction (e.g., without going through RGBH reconstruction 535 of FIG. 5). This can be given as:

$$\frac{dL}{dw} = \frac{\partial L}{\partial \hat{D}_{RGBH}} (J_{\hat{D}_{RGBH}}(w) + J_{\hat{D}_{RGBH}(B(w))}^0,$$

where $J_y(x)$ denotes the Jacobian of y with respect to x and L is the loss.

At every iteration of the optimization, an estimate of the reconstruction is generated, which itself requires joint participation of all images in the dataset to maximize the available information. This can be problematic as it requires both the reconstruction and the entire dataset to be in GPU memory at the same time. Batching is a standard solution, which at first glance would only work for the reprojection step, as the projection step requires all images to form the reconstruction. A two-step approach to overcome this requirement leverages the blocking backpropagation paths through the reconstruction described above so that the reconstruction can be generated incrementally in batches without worrying about accumulating gradients. Once the temporarily static reconstruction is generated given the current estimates of the image deformation parameters, the parameters can then be updated by registering batches of images to the reconstruction. As an alternative to requiring two passes through the dataset per epoch where the parameters are only updated during one of the passes, a one-step, end-to-end strategy can be used where each batch updates both the reconstruction and the parameters by keeping track of a running average of the reconstruction. In particular, the update rule for the reconstruction after the $(j+1)^{th}$ gradient step when presented with the $j^{th}$ batch as a list of warped coordinates and their associated RGB values, $(x_{w,j}, y_{w,j}, D_j)$, is given by $$B_{j+1} \leftarrow B_j$$

$B_{j+1}[x_{w,j},y_{w,j}] \leftarrow mB_j[x_{w,j},y_{w,j}] + (1-m)D_j$, where $0<m<1$ is the momentum controlling how rapidly to update B. The batch is specified very generally and can correspond to any subset of pixels from the dataset, whether grouped by image or chosen from random spatial coordinates. Only the spatial positions of the reconstruction visited by the batch are updated in the backprojection step, and the loss is computed with the same batch after the reprojection step. As a result, only one pass though the dataset is performed per epoch. This method is general and can be applied to other multi-image registration problems.

A specific implementation of the described method can jointly register and stitch all the images by estimating a coaligned height map, which acts as a pixel-wise radial deformation field that orthorectifies each camera image to allow homographic registration. The height maps themselves are reparameterized as the output of a single untrained encoder-decoder CNN with the raw camera images as the input. This single untrained CNN is optimized instead of the height map itself. Since the camera-centric height maps are by design coaligned with the camera images, they are automatically registered once the camera images are registered. Both the camera's dynamic 6D pose and its distortion are jointly estimated using a nonparametric model. That is, the method can simultaneously stitch multi-perspective images after warping the images to a common reference frame, reconstruct an object's 3D height profile, and estimate the camera's position, orientation, and distortion via a piecewise linear, non-parametric model in an end-to-end fashion without relying on feature point extraction and matching.

Figure 6:
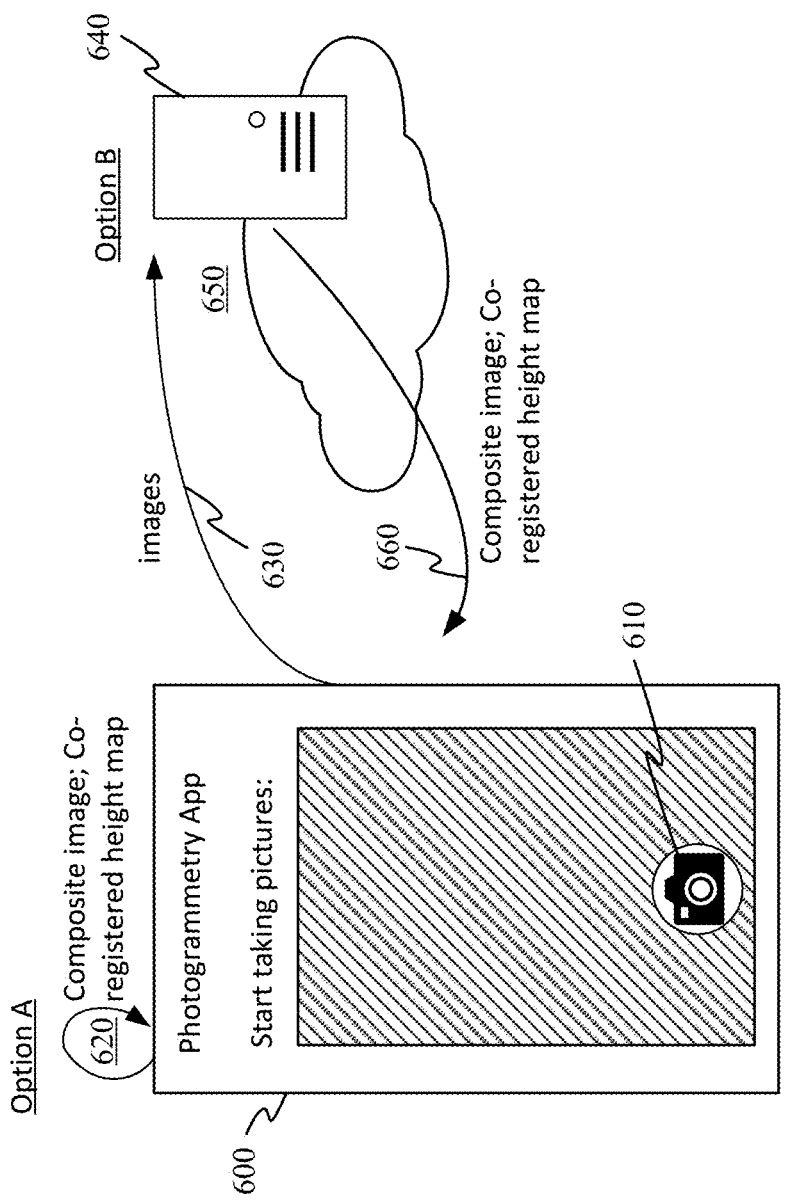
FIG. 6 shows an operating environment for photogrammetric imaging.
Figure 7A:
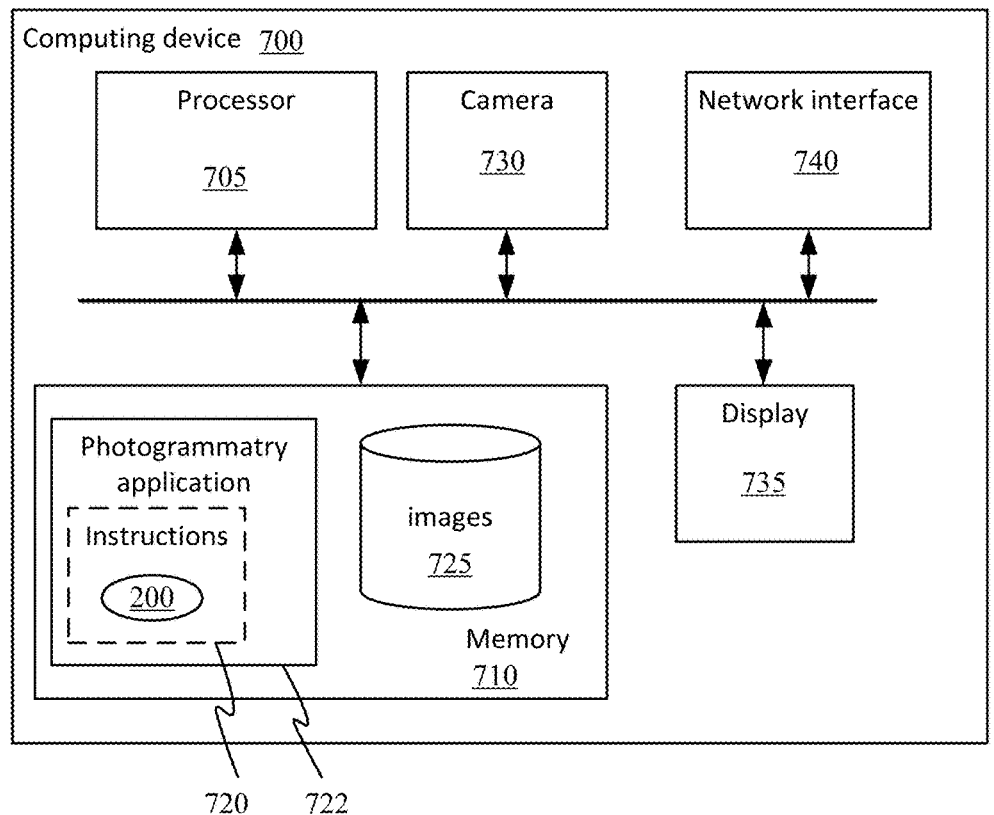
FIGS. 7A and 7B illustrate components of computing devices that may be used to implement the described photogrammetric imaging.
Figure 7B:
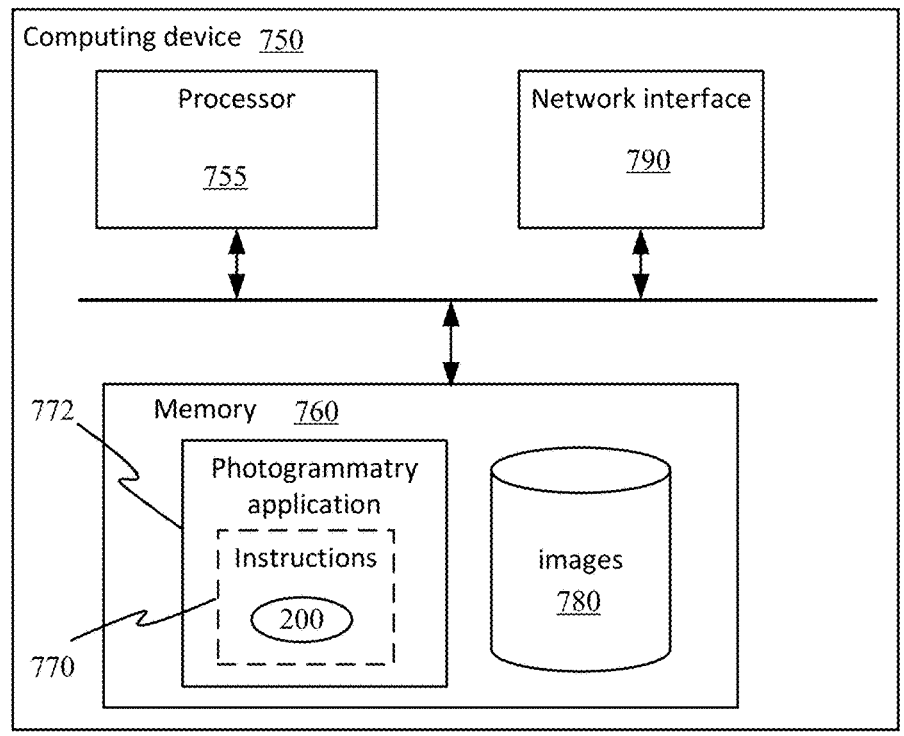

FIG. 6 shows an operating environment for photogrammetric imaging; and FIGS. 7A and 7B illustrate components of computing devices that may be used to implement the described photogrammetric imaging. Referring to FIG. 6, two options of operating environments are shown. It should be understood that other configurations are possible and that the illustrated environments are simply presented as examples. As shown in FIG. 6, a computing device 600 can be used to capture images from its camera 610. The computing device 600 can execute a photogrammetry application that receives a set of images either directly from the camera or from a storage resource on the computing device 600. In option A, the computing device 600 can execute method 200 as described with respect to FIG. 2 and implementations described with respect to FIG. 3 and/or FIG. 5.

For example, with reference to FIG. 7A, the computing device 600 embodied as computing device 700 can include a processor 705, memory 710, and instructions 720 stored on the memory 710 that when executed by the processor 705, direct the computing device 700 to perform operations for a photogrammetry application 722, including method 200. The set of images used by the photogrammetry application can be stored in a storage resource 725 of the memory 710 after being captured by camera 730. Computing device 700 includes display 735 and can further include a network interface 740 that enables the device 700 to communicate over a network.

Processor 705 can include one or more processors and can be, for example, a central processing unit (CPU), graphics processing unit (GPU), or field-programmable gate array (FPGA) that processes data according to instructions of various software programs, including instructions 720. Memory 710 can be one or more of any suitable computer-readable storage media including, but not limited to, volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices. As used herein, in no case does the memory 710 consist of transitory propagating signals.

Accordingly, returning to FIG. 6, in option A, the computing device 600 both takes the images (e.g., via camera 730 of FIG. 7A) and performs the described method (620) to output the composite image and co-registered height map to the display (e.g., display 735 of FIG. 7A).

In option B, the computing device 600 can capture the images and then communicate (via for example network interface 740 of FIG. 7A) a set of images 630 to a computing device 640 execute method 200 as described with respect to FIG. 2 and implementations described with respect to FIG. 3 and/or FIG. 5. Computing device 640 may be or includes a rackmount server, a router computer, a server computer, a personal computer, a mainframe computer, a laptop computer, a tablet computer, a desktop computer, etc.).

For example, with reference to Figure B, the computing device 640 embodied as computing device 750 can include a processor 755, memory 760, and instructions 770 stored on the memory 760 that when executed by the processor 755, direct the computing device 750 to perform operations for a photogrammetry application 772, including method 200. The set of images used by the photogrammetry application can be stored in a storage resource 780 of the memory 760 after being received via network interface 790 from computing device 600.

As with computing device 700, processor 705 can include one or more processors and can be, for example, a central processing unit (CPU), graphics processing unit (GPU), or field-programmable gate array (FPGA) that processes data according to instructions of various software programs, including instructions 770. Memory 760 can be one or more of any suitable computer-readable storage media including, but not limited to, volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices. As used herein, in no case does the memory 760 consist of transitory propagating signals.

Accordingly, returning to FIG. 6, in option B, the computing device 640 performs the described method (650) to output the composite image and co-registered height map 660 to the display (e.g., via network interface 790 of FIG. 7B to computing device 600 for display).

Experiments

Using the rear wide-angle camera of a Samsung Galaxy 10+ ($f_{eff}$=4.3 mm) and freehand motion, multiple image sequence datasets were collected consisting of 21-23 RGB 1512×2016 images (2×downsampled from 3024×4032). While the method does not require such limitations, the phone was kept approximately parallel and at a constant height (5-10 cm) from the sample while translating the phone laterally, to keep as much of the sample as possible within the limited depth of field associated with such close working distances. To obtain absolute scale, the magnification of the first image of each sequence was estimated using reference points of known separation in the background. The algorithm described with respect to FIG. 2 using the backpropagation described with respect to FIG. 3 (with orthorectification as the applied rectification model) and the optimization using a CNN described with respect to FIG. 5 was implemented in TensorFlow, which was run on an Intel Xeon Silver 4116 processor augmented with an 11-GB GPU (Nvidia RTX 2080 Ti). The same CNN architecture was used for all experiments, tuned on an independent sample to balance resolution and artifact reduction. Gradient descent via Adam was performed for 10,000 iterations for each sample with a batch size of 6. The flooring operation for the piecewise linear radial undistortion model used $n_r$=30. The running-average reconstruction was used with m=0.5.

The described method was compared to the open-source, feature-based SfM tool, COLMAP, which has been shown to outperform competing general-purpose SfM tools. COLMAP's full SfM pipeline was used with shared camera models and focal lengths, and the dense point cloud reconstructions were converted to height maps for comparisons.

Accuracy and Precision Characterization

Figure 8:
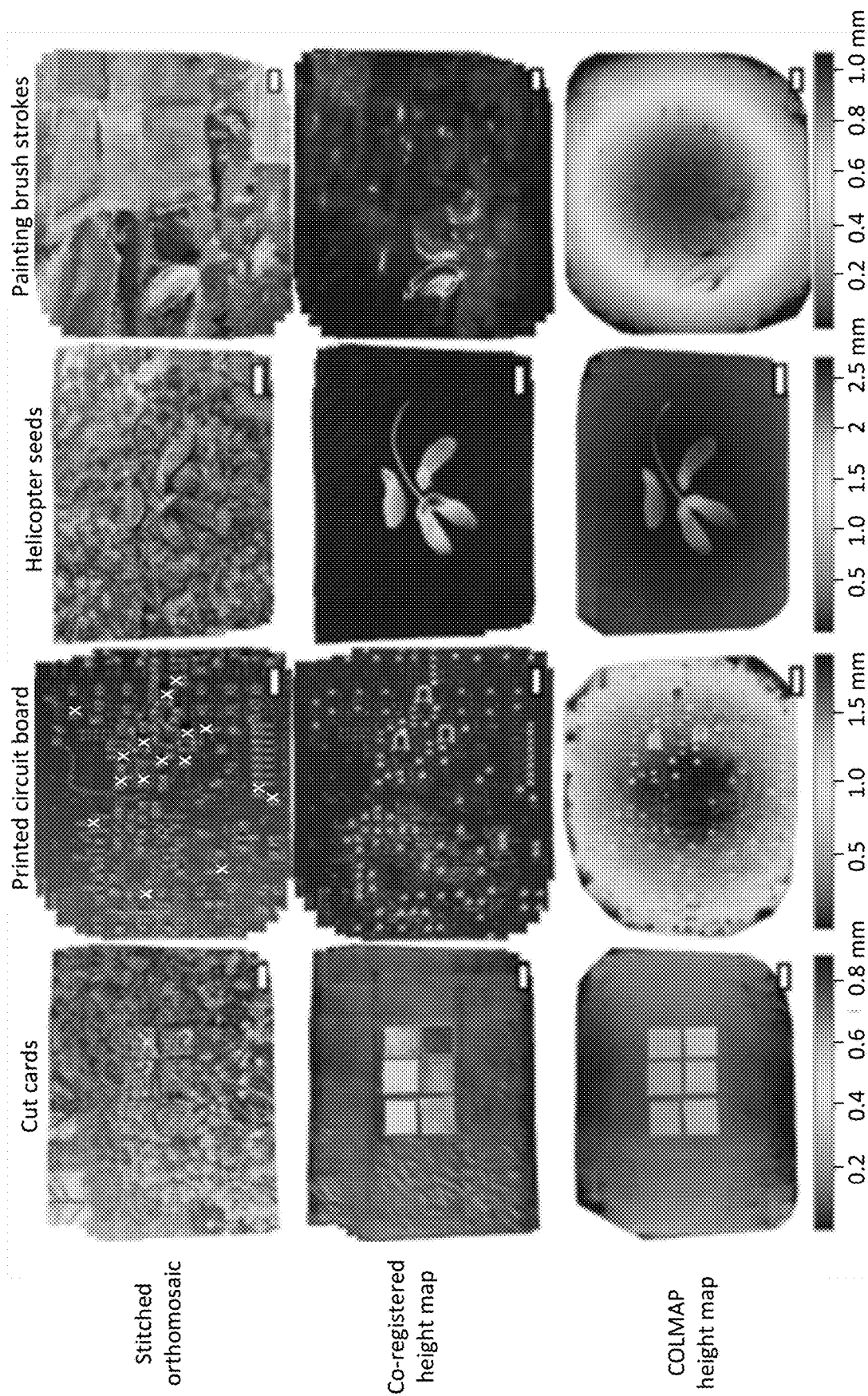
FIG. 8 shows a comparison of the described method to COLMAP for height map accuracy of images of cut cards, a printed circuit board (PCB), helicopter seeds, and painting brush strokes.

FIG. 8 shows a comparison of the described method to COLMAP for height map accuracy of images of cut cards, a printed circuit board (PCB), helicopter seeds, and painting brush strokes.

A calibrated phantom sample was created consisting of standard playing cards (~0.3-mm thick), cut into six 1-2-cm² squares, and with 0-5 layers of tape (50-70 μm thick per layer) attached to alter their heights. The thicknesses of the tape-backed cut cards were measured using calipers with 20-μm accuracy (Starrett EC799A-12/300), and arranged them on a flat, feature-rich surface. These measurements were regarded as the ground truths, $h_{gt}$ (see column 1 of Table 1).

Referring to FIG. 8, the stitched orthomosaics and height map reconstructions by the described method compared with COLMAP are shown in the first column, noting that COLMAP underestimates the card heights. To quantify accuracy and precision of both methods, the six cut cards and background were manually segmented based on the RGB orthomosaic, and the mean and standard deviation of the height values of these seven regions were computed. The results are shown in Table 1.

Table 1 shows accuracy (abs. error from ground truth (G.T.)) and precision (st. dev.) of the described method vs. COLMAP (CM) vs. CM rescaled to match G.T. of the cut card sample illustrated in the first column of FIG. 8 all units are μm.

TABLE 1

| Card # | Ours | | CM | | CM (scaled) | |
|---|---|---|---|---|---|---|
| (G.T.) | Acc. | Prec. | Acc. | Prec. | Acc. | Prec. |
| bkgd (0) | 59.4 | 45.5 | 235.6 | 59.6 | 19.2 | 157.8 |
| #1 (295) | 34.9 | 37.7 | 74.9 | 26.8 | 41.8 | 71.0 |
| #2 (350) | 2.0 | 36.5 | 24.0 | 24.6 | 2.4 | 65.2 |
| #3 (420) | 38.5 | 54.9 | 6.7 | 18.4 | 31.7 | 48.9 |
| #4 (485) | 6.0 | 26.2 | 55.6 | 20.6 | 9.4 | 54.7 |
| #5 (555) | 32.5 | 35.5 | 120.6 | 15.4 | 47.3 | 40.8 |
| #6 (625) | 10.5 | 28.4 | 151.6 | 18.1 | 14.1 | 47.9 |
| mean | 26.3 | 37.8 | 95.6 | 26.2 | 23.7 | 69.5 |

Because the height maps have an arbitrary global shift, the shift that minimizes the MSE between the mean height estimates and the ground truths: $\Delta h = \text{mean}(h_{gt} - h_{est})$ was used. While COLMAP underestimates heights and therefore has low absolute accuracy, it was hypothesized that the relative accuracy might be high. To test this, COLMAP's height estimates were scaled by the factor that minimizes MSE between mean height estimates and ground truths, given by $\text{cov}(h_{gt}, h_{est})/\text{var}(h_{est}) \approx 2.65$ (Table 1). As can be seen, the described method has simultaneously high accuracy (26.3 μm) and precision (37.8 μm) and without the need to rescale.

As can be seen from the second, third, and fourth columns of FIG. 8, a comparison of the described method and COLMAP was made with respect to a PCB, helicopter seeds, and the brush strokes on a painting. COLMAP not only consistently underestimates heights, but also exhibits unpredictable surface curvatures. In contrast, it can be seen that the described method is robust to this degeneracy. The height accuracy and precision were quantified on 16 of the PCB components using caliper estimates as the ground truth and manual segmentation based on the RGB orthomosaics (see Table 2).

Table 2 shows quantification of accuracy and precision (in μms) of the described method compared to COLMAP (CM) on PCB components (identified in the composite image with x's).

TABLE 2

| | | bkgd | C120 | C121 | C126 | C142 | C147 | C181 | C182 | C203 |
|---|---|---|---|---|---|---|---|---|---|---|
| | G.T. | 0 | 1253 | 1257 | 1269 | 618 | 1282 | 632 | 632 | 1357 |
| Ours | Acc. | 119.8 | 41.4 | 15.8 | 79.0 | 60.1 | 163.6 | 5.8 | 56.0 | 43.5 |
| | Prec. | — | 138.4 | 123.5 | 133.2 | 32.2 | 175.1 | 45.3 | 34.2 | 86.7 |
| CM | Acc. | 455.7 | 435.4 | 557.7 | 193.9 | 116.6 | 90.7 | 401.6 | 225.0 | 456.9 |
| | Prec. | — | 108.0 | 140.2 | 83.4 | 248.1 | 163.4 | 118.5 | 95.5 | 133.8 |

| | | C57 | R135 | R144 | R175 | R184 | U70 | U71 | U72 | mean |
|---|---|---|---|---|---|---|---|---|---|---|
| | G.T. | 677 | 533 | 548 | 476 | 427 | 1772 | 1771 | 1778 | — |
| Ours | Acc. | 94.3 | 122.4 | 89.3 | 21.0 | 52.7 | 44.3 | 27.5 | 31.9 | 62.9 |
| | Prec. | 139.2 | 117.0 | 61.0 | 17.6 | 52.9 | 101.1 | 141.6 | 134.5 | 95.8 |
| CM | Acc. | 548.0 | 74.6 | 173.3 | 452.5 | 305.4 | 502.1 | 388.9 | 168.3 | 326.3 |
| | Prec. | 51.7 | 98.7 | 91.3 | 105.0 | 70.4 | 90.9 | 95.3 | 123.6 | 113.6 |

Importance of Undistortion

Figure 9:
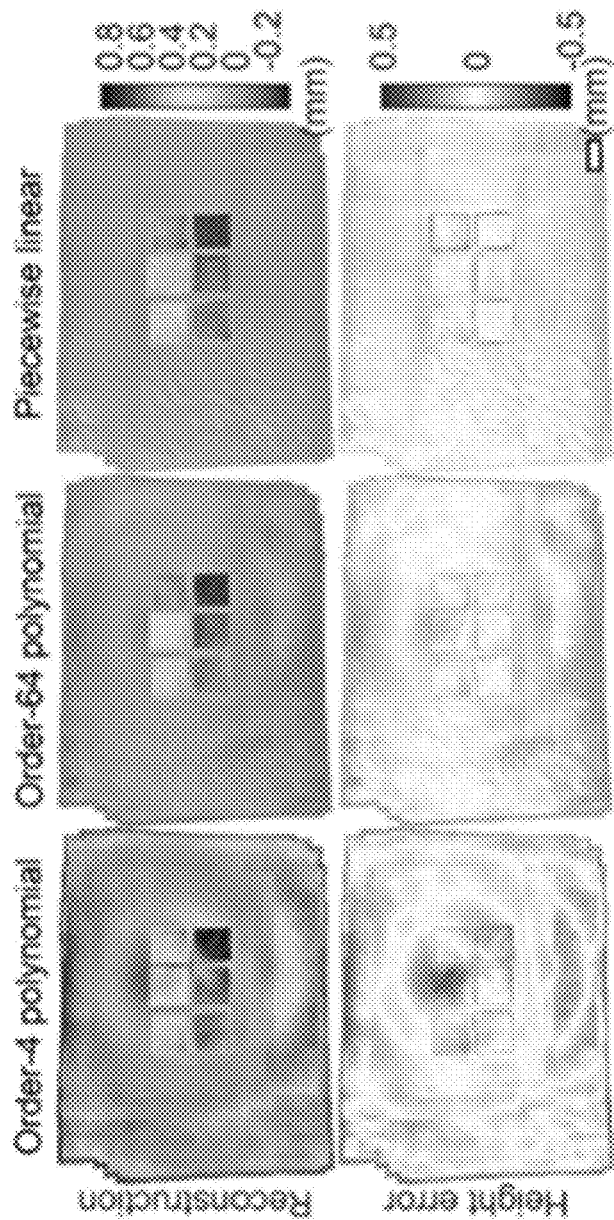
FIG. 9 shows a visual comparison of height map reconstructions of the cut cards sample shown in FIG. 8 using different undistortion models.
Figure 10:
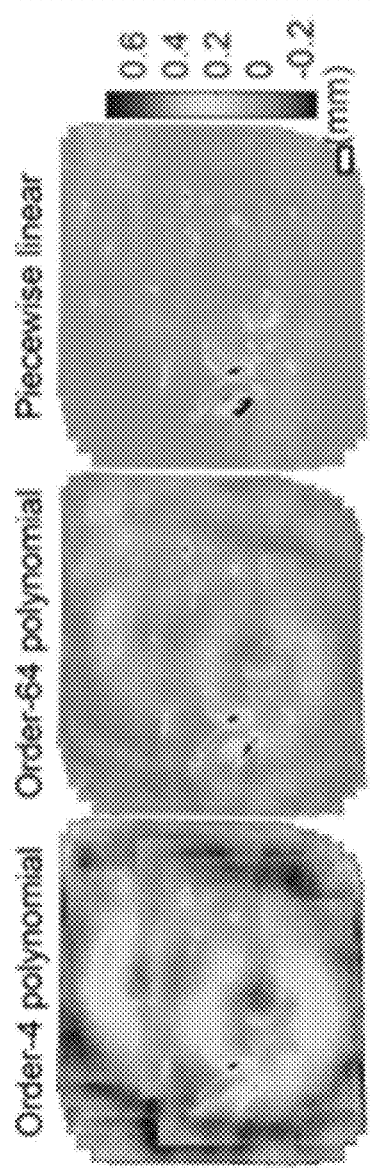
FIG. 10 shows a visual comparison of a height map reconstruction of the painting sample shown in FIG. 8 using different undistortion models.
Figure 11:
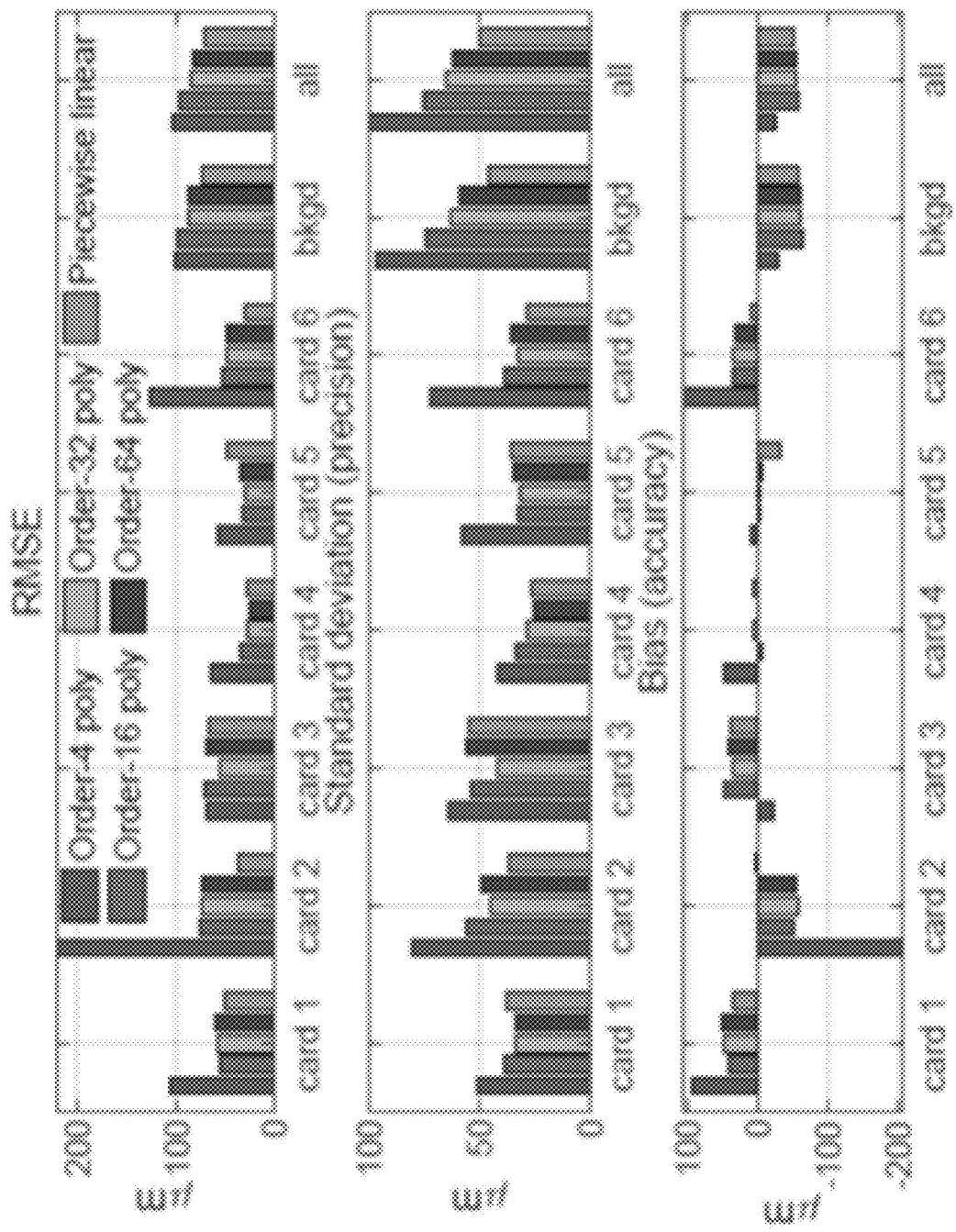
FIG. 11 shows plots of height estimation performance on the 6 cut cards, background, and whole image for various undistortion models.

FIG. 9 shows a visual comparison of height map reconstructions of the cut cards sample shown in FIG. 8 using different undistortion models; and FIG. 10 shows a visual comparison of a height map reconstruction of the painting sample shown in FIG. 8 using different undistortion models. FIGS. 9 and 10 show spurious rings when camera distortions are not sufficiently modeled, particularly with respect to application of the polynomial models. In particular, although for conventional macro-scale applications it is often sufficient to use a low-order even polynomials (e.g., order-4)), for mesoscopic applications, even using an order-64 polynomial undistortion model leaves behind noticeable ring artifacts. In contrast, using a piecewise linear model (30 segments) as described herein effectively eliminates the ring artifacts. FIG. 11 shows plots of height estimation performance on the 6 cut cards, background, and whole image for various undistortion models. FIG. 11 quantifies the performance of multiple undistortion models via root-MSE (RMSE), precision, and accuracy of heights of the cut cards sample. Not only does the piecewise linear model generally have better precision and overall RMSE than the polynomial models, but also it does not exhibit biases caused by the ring artifacts (e.g., card 2), which cannot be corrected by a global scale or shift.

Effectiveness of CNN Regularizer

Figure 12:
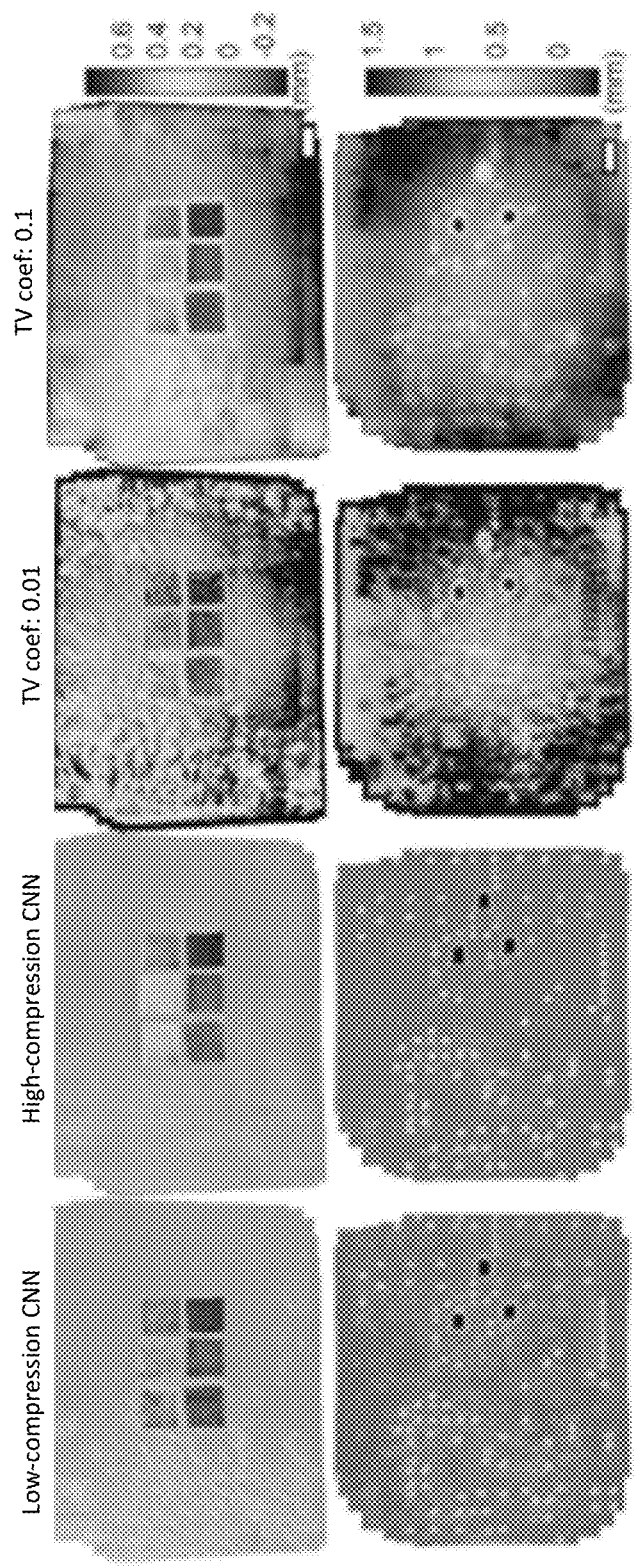
FIG. 12 shows a visual comparison of height map reconstructions of the cut cards and PCB samples of FIG. 8 using different CNNs (convolutional neural networks) and TV (total variation) regularization.

FIG. 12 shows a visual comparison of height map reconstructions of the cut cards and PCB samples of FIG. 8 using different CNNs (convolutional neural networks) and TV (total variation) regularization. As described above, the CNN can be implemented as an encoder-decoder network without skip connections, where the degree of compression can be adjusted by the number of parameters and downsampling layers. As can be seen in FIG. 12, varying the degree of compression controls the amount of fine detail transferred to the height map without affecting the flatness of the field of view or blurring edges. Thus, the degree of compression in the CNN is an interpretable means of tuning the regularization. However, if the camera-centric height maps are optimized directly with total variation (TV) regularization, many artifacts can be seen, even when the regularization is strong enough to blur sharp edges.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of mesoscopic photogrammetry, comprising:
receiving a set of images;
generating a composite image, the generating of the composite image comprising:
applying homographic rectification to warp all images of the set of images onto a common plane;
applying a perspective distortion rectification model to undo perspective distortion in each image of the set of images; and
applying an undistortion model for adjusting for camera imperfections of a camera that captured each image of the set of images;
generating a height map co-registered with the composite image, the generating of the height map comprising:
applying a raw image form of each image of the set of images as input to a neural network that outputs the height map, wherein at least a plurality of images of the set of images are utilized to generate the height map; and
optimizing parameters of the neural network to optimize the height map, wherein the parameters of the neural network to optimize the height map comprise a 6D camera pose and distortion and the height map; and
outputting the height map and the composite image for display.

2. The method of claim 1, wherein the neural network is an untrained convolutional neural network.

3. The method of claim 1, wherein the perspective distortion rectification model is an orthorectification model.

4. The method of claim 1, wherein the perspective distortion rectification model is an arbitrary reference rectification model.

5. The method of claim 1, wherein the undistortion model comprises a piecewise linear, nonparametric model.

6. The method of claim 5, wherein the piecewise linear, nonparametric model includes a radially dependent relative magnification factor that is discretized into $n_r$ points, $\{\tilde{M}\}_{t=0}^{n_r-1}$, paced by $\delta_r$ with intermediate points linearly interpolated as:

$$\tilde{M}(r) = \left(1 + \left\lfloor \frac{r}{\delta_r} \right\rfloor - \frac{r}{\delta_r}\right)\tilde{M}_{\lfloor \frac{r}{\delta_r} \rfloor} + \left(\frac{r}{\delta_r} - \left\lfloor \frac{r}{\delta_r} \right\rfloor\right)\tilde{M}_{\lfloor \frac{r}{\delta_r} \rfloor + 1}$$

where $\lfloor \sim \rfloor$ is a flooring operation, $0 \leq r < (n_r-1)\delta_r$ is a radial distance from a distortion center;
wherein for a given point in each image, $r_{im}$, the applying of the undistortion model is given by $r_{im} \leftarrow \tilde{M}(|r_{im}|)r_{im}$.

7. A computing device, comprising:
a processor, memory, and instructions stored on the memory that when executed by the processor, direct the computing device to:
receive a set of images;
generate a composite image by:
applying homographic rectification to warp all images of the set of images onto a common plane;
applying a rectification model to undo perspective distortion in each image of the set of images; and
applying an undistortion model for adjusting for camera imperfections of a camera that captured each image of the set of images;
generate a height map co-registered with the composite image by:
applying a raw image form of each image of the set of images as input to a neural network that outputs the height map, wherein at least a plurality of images of the set of images are utilized to generate the height map; and
optimizing parameters of the neural network to optimize the height map, wherein the parameters of the neural network to optimize the height map comprise a 6D camera pose and distortion and the height map; and
output the height map and the composite image for display.

8. The computing device of claim 7, further comprising:
a camera, wherein the camera captures the set of images.

9. The computing device of claim 7, further comprising:
a display, wherein the instructions to output the height map and the composite image for display direct the computing device to display the height map or the composite image at the display.

10. The computing device of claim 7, further comprising:
a network interface, wherein the computing device receives the set of images via the network interface.

11. The computing device of claim 10, further comprising:
instructions for implementing the neural network stored on the memory.

12. The computing device of claim 7, wherein the rectification model is an orthorectification model.

13. The computing device of claim 7, wherein the rectification model is an arbitrary reference rectification model.

14. The computing device of claim 7, wherein the undistortion model comprises a piecewise linear, nonparametric model.

15. A computer-readable storage medium having instructions stored thereon that when executed by a computing device, direct the computing device to:
receive a set of images;
generate a composite image by:
applying homographic rectification to warp all images of the set of images onto a common plane;
applying a rectification model to undo perspective distortion in each image of the set of images; and
applying an undistortion model for adjusting for camera imperfections of a camera that captured each image of the set of images;
generate a height map co-registered with the composite image by:
applying a raw image form of each image of the set of images as input to a neural network that outputs the height map, wherein at least a plurality of images of the set of images are utilized to generate the height map; and
optimizing parameters of the neural network to optimize the height map, wherein the parameters of the neural network to optimize the height map comprise a 6D camera pose and distortion and the height map; and
output the height map and the composite image for display.

16. The computer-readable storage medium of claim 15, wherein the applying of the homographic rectification, the applying of the rectification model, and the applying of the undistortion model are performed simultaneously.

17. The computer-readable storage medium of claim 15, wherein the undistortion model comprises a piecewise linear, nonparametric model.

18. The method of claim 1, wherein the set of images are captured by a camera of a mobile computing device with unstabilized, freehand motion and without precalibration of camera distortion.

* * * * *